Figure 3:
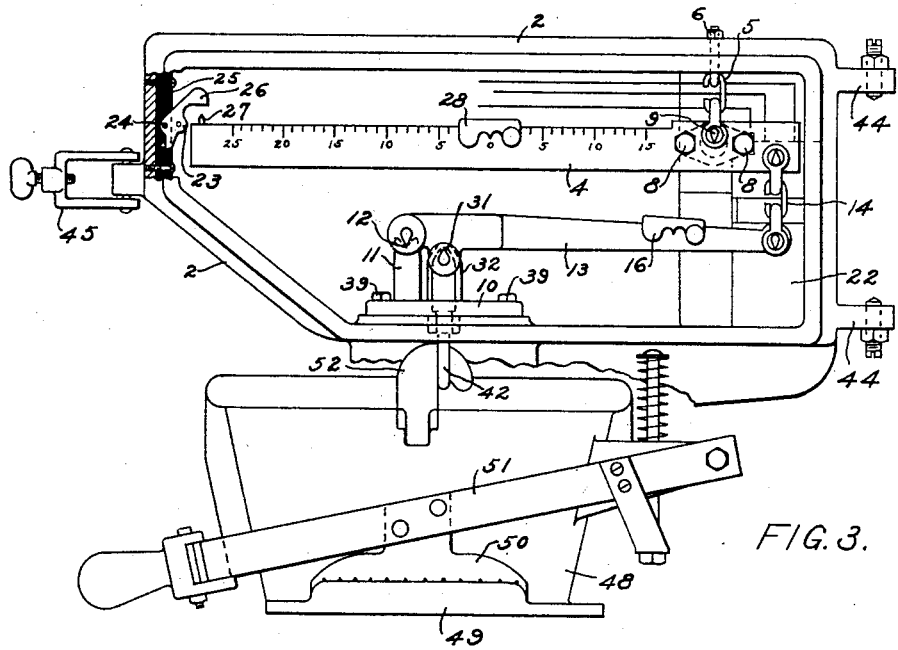

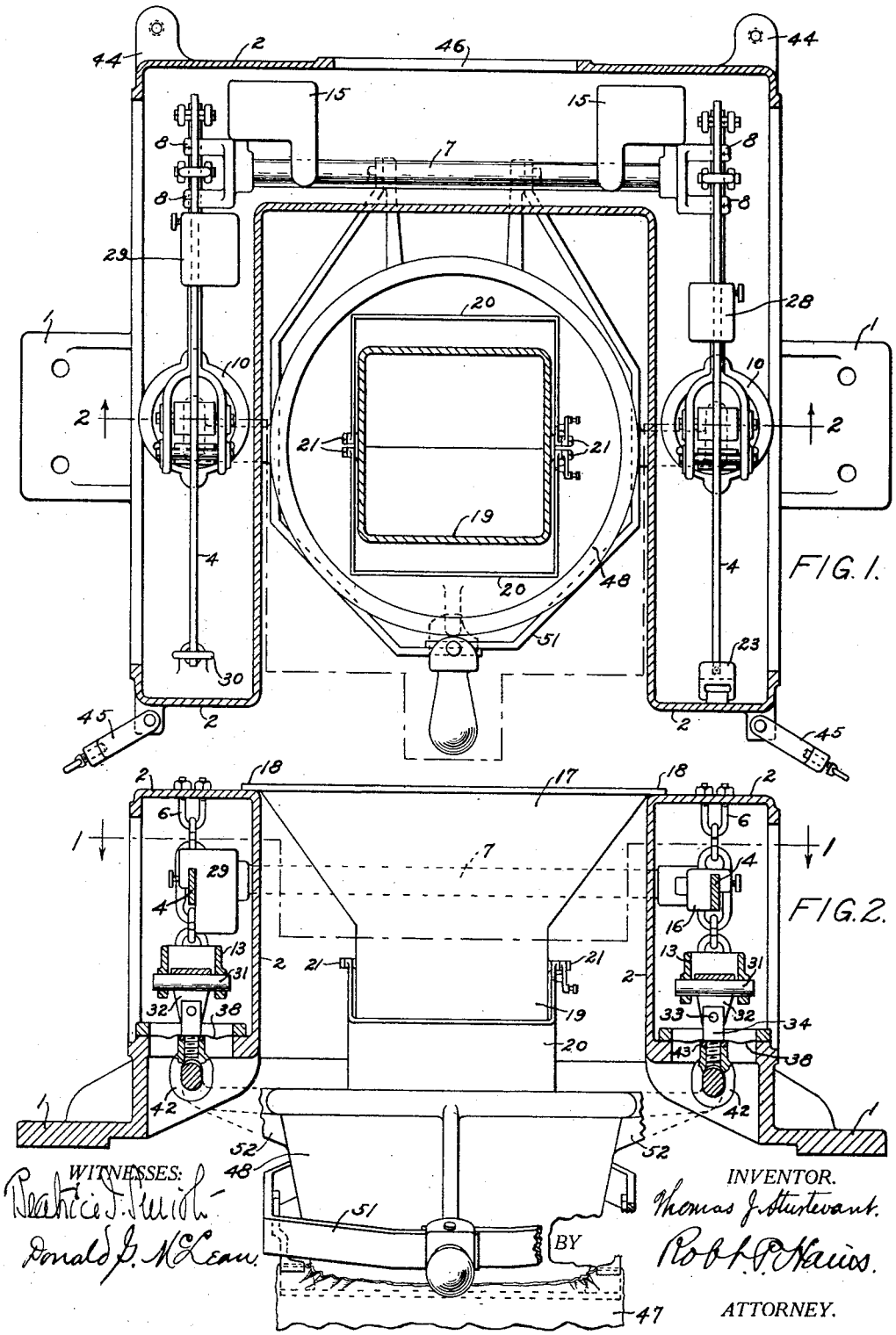

T. J. STURTEVANT.
WEIGHING DEVICE.
APPLICATION FILED MAR. 19, 1915.

1,161,011.

Patented Nov. 16, 1915.
2 SHEETS—SHEET 2.

WITNESSES
INVENTOR.
Thomas J. Sturtevant
BY
ATTORNEY.

UNITED STATES PATENT OFFICE.

THOMAS J. STURTEVANT, OF WELLESLEY FARMS, MASSACHUSETTS, ASSIGNOR TO STURTEVANT MILL COMPANY, OF BOSTON, MASSACHUSETTS, A CORPORATION OF MAINE.

WEIGHING DEVICE.

1,161,011. Specification of Letters Patent. Patented Nov. 16, 1915.

Application filed March 19, 1915. Serial No. 15,605.

*To all whom it may concern:*

Be it known that I, THOMAS J. STURTEVANT, a citizen of the United States, residing at Wellesley Farms, county of Norfolk, and State of Massachusetts, have invented an Improvement in Weighing Devices, of which the following description, in connection with the accompanying drawings, is a specification, like letters on the drawings representing like parts.

The invention to be hereinafter described relates to weighing devices, and more particularly to such devices as are employed for weighing granular or comminuted material, such as grain, fertilizers and the like, as said material is being transferred to a container.

In devices of this general nature, it is customary to support the receiving container such as a bag or the like, from the weighing instrument and to transfer the material thereto from a source of supply through a chute provided with a cut-off, which, when the proper weight of material has passed into the container or bag, automatically stops the inflow. As the granular or comminuted material passes through the chute into the container or bag, dust and fine particles of the material being weighed rise and float about the weighing instrument and settle upon the knife edge bearings thereof, with the result that soon the accuracy of the weighing instrument becomes impaired. Accuracy and uniformity of weight of any series of filled containers or bags require that the sensibility of the weighing instrument shall remain unchanged through the operations of filling and weighing the entire series, and if, as above-noted, the bearings of the weighing instrument become more or less covered by the material being weighed during the course of the operations, those containers or bags filled near the end of the operation will not contain the same weight of material as those filled nearer the beginning of such operation, and, indeed, the weight will vary throughout the series of bags filled.

One form of instrument found well adapted to filling and weighing bags with granulated or other comminuted material that will flow readily, comprises a beam scale from which a bag holder is supported and a chute leading into the bag and holder and having closing valves or doors, which, when the desired weight of material has been placed in the bag, close and shut off further supply. When this occurs, there is still a stream of material between the chute and bag which is in the air, so to speak, and consequently not weighed, and as this material passes into the bag after the requisite weight has been reached, the bag will contain more material than desired. To overcome this inaccuracy, the weighing instrument has been formed of two main portions, one of which may be adjusted to allow for the extra material that goes into the bag and which may be known as the "tare scale or beam" and the other of which may be the "weighing scale or beam," the two being connected to operate as one, and from these two scales or beams the bag to be filled is supported. The dust and particles of material, therefore, not only find their way to the bearings of the weighing scale or beam, but also to those of the tare scale or beam, with the result that a double factor of inaccuracy exists to disturb uniformity and correct weight in any series of bags filled.

Such weighing devices are frequently automatic in character, as set forth in the Kneeland Patent, No. 967,935, August 23, 1910, wherein, when the desired weight of material has been placed in the bag or other container, an electric circuit is closed or otherwise changed to cause the closing members of the chute to shut off the flow of material into the bag or container. Accuracy of weighing requires that the electric contacts be clean and free from the dirt and dust incident to filling the bags or containers. With these various matters in mind, the aims and purposes of the present invention are to provide a weighing device which shall be free from the disturbing influences of dust and floating particles of the material being weighed, and wherein the entire weighing device shall be so protected that the knife edge bearings and the electric contacts which automatically cause the flow of material into the bag or container to be interrupted when the proper weight of such material has been placed therein, shall be maintained in the same uniform condition throughout the operation of filling and weighing a series of bags or containers, and wherein, also, the same uniform weight shall be insured for all the bags of a series.

Figure 4:
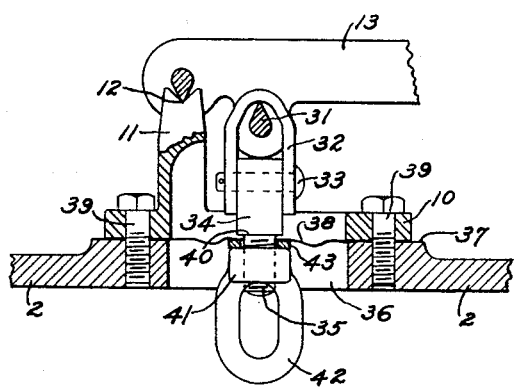

In the drawings:—Figure 1 is a sectional plan view on the line 1—1, of Fig. 2, of a weighing device embodying the present invention; Fig. 2 is a vertical section on the broken line 2—2, Fig. 1, showing the general arrangement of the weighing instrument, its casing, and associated parts. Fig. 3 is a side view of the device with some of the parts broken away, and the door of the casing removed. Fig. 4 is an enlarged detail showing more particularly the link suspended from one of the arms of the weighing instrument and passing through a perforation in the casing, and the flexible diaphragm for excluding dust and dirt from the passageway or opening in the casing through which the link passes.

The supporting frame may be of appropriate structure, and is not herein shown, as it forms no part of the present invention. It is, however, adapted to receive and sustain the feet or supports 1 projecting from each side of an inclosing casing 2, in which is contained the weighing instrument, as will more fully appear.

The weighing device may be of appropriate character, but is preferably herein shown as comprising the two scale beams 4 supported by links 5 from suspending bolts 6 mounted in the top of the casing 2. Connecting the two scale beams 4 is a rod or connection 7, Fig. 1, which may be appropriately secured to each of the scale beams 4 by means of suitable threaded nuts 8 or otherwise, as desired, and between such threaded nuts, as indicated in Fig. 1, the beams 4 are supported by the knife edge bearings 9, the construction being such that the two scale beams 4 will rock in unison on their respective suspended knife bearings 9.

Rising from the plate 10 beneath each of the beams 4, as indicated in Figs. 1 and 3, is a support 11 for the knife bearing 12 of the lever arms 13, the free ends of which arms are connected respectively by links 14 to the short arms of the beams 4. To each of the lever arms 13, as will hereinafter more fully appear, is connected the suspending means for supporting the receiver or bag into which the material to be weighed is placed.

In order that the system may be approximately balanced permanently, the rod or connection 7 is provided with the counterbalancing weights 15, Fig. 1, which may be permanently secured in place, and in order that any correction may be made for lack of balance from the construction thus far described, the lever arms 13 may be provided with sliding weights 16 readily adjustable thereon to different positions, according to the demands of the system.

In devices of the general character described, and as hereinbefore noted, the material is fed to the container or bag in which it is weighed, through a suitable chute or hopper. As a preferred form of such construction, the present invention contemplates a chute or hopper 17, Figs. 1 and 2, the upper flanged portions 18 of which may be properly supported upon the top of the inclosing casing 2. The lower portion of the hopper is provided with a discharge spout 19 which is controlled by gates 20 of appropriate form. In the present form of the invention these gates 20 are pivoted at each side of the discharge spout 19, as at 21, and means are provided for opening said gates when the required amount or weight of material has been received by the bag or container. In the present form of the invention, the means for thus controlling the gates 20 comprises an electric circuit connected to a battery 22, Fig. 3, preferably contained within the casing 2; and connected with one pole of said battery is the movable contact 23, Fig. 3. This contact 23 is pivotally mounted at 24, upon an insulated block 25 and the overhanging end 26 of said contact is in the path of movement of the contact 27 mounted on one of the scale beams 4, which is itself connected to the other pole of the battery, the construction being such that when the scale beam 4 rises under the weight of the suspended filled container or bag, the contact 27 will engage the overhanging end 26 of the contact 23 and complete the circuit, thereby causing the gates 20 to close. Any usual form of gate closing means may be employed in this connection, such, for instance, as shown in the Kneeland Patent, No. 967,935, hereinbefore referred to; and as such electrically controlled device forms no essential part of the present invention, except in so far as the contacts 23 and 27 are concerned, further illustration and description herein is unnecessary.

From the construction described with respect to the contacts 23 and 27, it will be noted that when the scale beam 4 rises to bring the contact 27 into engagement with the overhanging end 26 of the contact 23, the latter tilts upon its pivotal mounting, thereby causing a rubbing action between the contact 27 and the overhanging end 26 of the contact 23, thus keeping the contacting surface in polished condition and enhancing the sensibility of the gate-controlling devices.

As hereinbefore noted, in weighing devices of the general character described, when the gates 20 are closed, a portion of the granular material passing through the discharge spout 19 into the container or bag, will not have reached the container or bag, and consequently its weight will not be measured. To compensate for this material which is still in the air, one of the beams of the weighing device (which may be known as the tare beam), is provided with a weight 28, Fig. 1, which may be adjusted to the desired position on the beam to compensate or allow for the material still in the air when the gates 20 close. The other beam 4, technically known as the weighing beam, is provided with the usual adjustable weight 29, and in order that when the tare beam carrying the contact 27 is arrested by the contact 23 the weighing beam may be likewise arrested to prevent strain between the two beams, a stop 30 is employed to engage the end of the weighing beam, as indicated in Fig. 1.

In weighing granular or comminuted materials, such, for instance, as grain, seed, fertilizer, and the like, it is important that the knife edge bearings of the weighing device, as well as the contact surface of the electric contacts, shall not be subjected to the deposit of dust, dirt, or other foreign matter that is liable to float into the air during the weighing operation. As a means to this end, the present invention contemplates inclosing the weighing instrument, including its supports and knife edge bearings, in a dust-proof casing; and to this end the casing 2, which, in the present form of the invention is shown as of general U-shape in plan view, as indicated in Fig. 1, in order to sustain between the side members thereof the hopper 17, is provided with an opening in the bottom of each side portion through which the suspending links connecting the weighing instrument with the container or bag pass; and the said opening is provided with a flexible diaphragm, which, while permitting unobstructed movement of the suspending links during the weighting operation, precludes the entrance of dust, dirt, or other foreign matter into the inclosing casing.

As indicated in Figs. 2 and 3, the lever arm 13 is provided with the knife edge bearing 31 from which is suspended the link 32 connected by a bolt 33 with the block 34, provided at its depending end with a screw-threaded projection 35 extending through an opening 36 in the bottom portion of the casing 2. The base plate 10 has interposed between it and the inner surface 37 of the casing 2, a flexible diaphragm 38 properly secured between the base plate 10 and the casing by suitable means, such as the bolts 39. The flexible diaphragm 38 may be formed of any suitable material such as rubber or the like, and is provided with a central opening through which passes the screw 35. The block 34 has a shouldered portion 40 larger than the opening through the flexible diaphragm 38 and threaded to the part 35 is the internally threaded block 41 which may conveniently be formed integral with the suspending link 42. A washer 43 is preferably interposed between the threaded block 41 and the diaphragm, the construction being such that when the parts are assembled as in Fig. 4, the edge portions of the central opening of the diaphragm 38 will be clamped between the shoulder 40 and the threaded block 41, whereby the openings 36 through the bottom of the casing, will be closed against the passage of any dust or foreign particles. The parts are shown in Fig. 4 in somewhat separated relation to indicate more clearly the relative position of the edge portions of the central opening of the diaphragm 48, the shoulder 40 and washer 43; but when the parts are tightened up, this separated relation disappears and the edge portions of the central opening of the diaphragm 38 will be clamped tightly between the washer 43 and the shoulder 40, substantially as indicated in Fig. 2.

Each side portion of the casing 2 may be and preferably will be, provided with the door mounted to swing upon hinged connections 44, Figs. 1 and 3, and may be clamped in closed position by suitable clamping means such as the swivel pieces 45. These doors may, if desired, be provided with glass in order to readily observe the action of the weighing instrument, and if desired, the rear portion of the casing 2 may be provided with a glass panel as at 46, for the same purpose.

In filling and weighing bags and other like containers, the bag or container 47, Fig. 2, may be appropriately sustained upon a bag support 48, having a ledge portion 49 and a bag clamp 50 connected to an operating handle 51. The said bag holder 48 may likewise be provided with suspending lugs 52, one at each side, as indicated in Figs. 2 and 3, to engage the suspending links 42 depending from the lever arms 13, one at each side of the weighing device, as indicated in Fig. 2.

From the construction described, it will be apparent that when the doors of the casing are closed, and the material is fed through the hopper 17 into and through the bag holder 48, to the bag 47, the dust, dirt, and other foreign particles incident to the weighing operation, will be entirely excluded from the weighing instrument. The supports and knife bearings of the weighing instrument, as well as the contacts, will be preserved from any accumulation of dust or dirt thereon, with the result that the accuracy of weight of any granular or comminuted material fed into a series of bags will be rendered uniform throughout, and the delicacy of operation of the weighing instrument will be preserved. At the same time, the suspending means, such as the suspending links hereinbefore described for the bag holder 48, may move unobstructed in the openings in the bottom portion of the casing, owing to the delicate flexibility of the flexible diaphragm 38, and such diaphragm will effectively prevent the passage of dust or dirt into the casing.

Changes may of course be made in the details of the means employed in carrying the invention into practical effect, but the described construction has been found to be convenient and effective in operation, and to preserve the delicacy of the weighing instrument.

What is claimed is:—

1. In a device of the character described, the combination of a weighing instrument comprising a tare scale beam and a connected weighing scale beam, an inclosing casing for said weighing instrument, two parts extending through said casing, one connected to the tare scale beam and the other to the weighing scale beam, means for supporting a bag or container from said two parts outside of the casing and flexible diaphragms extending between said two parts and the casing to prevent entrance of dust or particles to the bearings of the tare and weighing beams through that portion of the casing through which said two parts extend.

2. In a device of the character described, the combination with a weighing instrument comprising a tare beam and a weighing beam, and their supports, a casing inclosing said beams and their supports, a bag holder adapted to be suspended between said two beams, a suspending link connected to each of said beams within the inclosing casing and extending through the same, and a flexible diaphragm between each of said links and the part of the casing through which said links extend, said flexible diaphragm permitting unobstructed movement of the links during the weighing operation and excluding dirt and dust from the inclosing casing.

3. In a device of the character described, the combination of a scale beam and its supports, a casing inclosing said beam and supports, an electric contact carried by the beam within said casing, a second electric contact positioned within the casing for engagement by the contact carried by the beam, a supporting device for the material to be weighed extended through the casing, a flexible diaphragm closely fitted about and connected to said supporting device, and means for connecting the diaphragm to the part of the casing through which the supporting device extends, said flexible diaphragm and casing acting to exclude dust and foreign matter from the scale beam supports and the surfaces of the electric contacts and insure electric union of said contacts when they are brought into engagement during the weighing operation.

4. In a device for weighing granular or comminuted material, the combination of a weighing instrument, a dust-proof inclosing casing for said instrument having an opening in the bottom thereof, a base plate having an opening registering with the opening in the bottom of the casing, a suspending link connected to the weighing instrument and extending through said openings, a flexible diaphragm through which said link passes for unobstructed movement during the weighing operation, and means for clamping the flexible diaphragm between the bottom of the casing and said base plate.

5. In a device for weighing granular and other material, having in combination a weighing instrument, a dust-proof casing inclosing said instrument and having an opening in the bottom thereof, a flexible diaphragm extending over said opening, a suspending link connected to the weighing instrument and passing through said diaphragm, said link having a shouldered portion, means for clamping the diaphragm against the shouldered portion of the link, and means for securing the edge portions of the diaphragm to the bottom of the casing to permit the link to move in said opening during the weighing operation and closing the opening to the passage of dust or dirt.

6. In a device of the character described, the combination of a dust-proof casing, a weighing instrument having lever arms inclosed in said casing, said casing being provided with a bottom opening, a base plate having an opening registering with the bottom opening in said casing and provided with an upright for supporting one of the said lever arms, a diaphragm extending across and closing said openings, a suspending link connected to the lever supported by said upright and passing through the diaphragm, and means for connecting the diaphragm to the suspending link and casing.

In testimony whereof, I have signed my name to this specification, in the presence of two subscribing witnesses.

THOMAS J. STURTEVANT.

Witnesses:
BEATRICE I. SMITH,
ELLEN B. TOMLINSON.

Copies of this patent may be obtained for five cents each, by addressing the "Commissioner of Patents, Washington, D. C."